March 25, 1958    B. G. TREMBLAY ET AL    2,828,384
CIRCUIT BREAKER
Filed July 19, 1954    4 Sheets-Sheet 4

United States Patent Office 2,828,384
Patented Mar. 25, 1958

2,828,384

CIRCUIT BREAKER

Bernard G. Tremblay, Pittsburgh, and William H. Stuellein, East McKeesport, Pa., assignors to Westinghouse Electric Corporation, East Pittsburgh, Pa., a corporation of Pennsylvania Application July 19, 1954, Serial No. 444,304

11 Claims. (Cl. 200—108)

This invention relates to circuit breakers and more particularly to circuit breakers of the type used for controlling light to moderate power distribution circuits.

An object of the invention is to provide a circuit breaker with a trip device which will trip the circuit breaker open in response to overload currents above a predetermined value and which will indicate the presence of an overload current below said predetermined value.

Another object of the invention is to provide a circuit breaker embodying trip means for instantaneously tripping the breaker open in response to overload currents above a predetermined value and a time-delay means indicating the presence of an overload current below said predetermined value without tripping the breaker open.

Another object of the invention is to provide a circuit breaker embodying a trip and signalling device which will give a signal in response to low overload currents without tripping the breaker and which will trip the breaker in response to short-circuit currents.

Another object of the invention is to provide a circuit breaker embodying an electromagnetic device for instantaneously tripping the breaker in response to short-circuit currents and for actuating a signal device in response to low overload currents and having time delay means providing a time delay in the operation of the signal device.

Another object of the invention is to provide a circuit breaker embodying a signalling device operable to give a signal in response to low overload currents with time-delay means calibrated to delay operation of the signalling device for a predetermined time after the occurrence of an overload current, and an overcurrent trip device for tripping the breaker in response to low overload currents having time delay means calibrated to delay operation of the overcurrent trip device for a predetermined time after the operation of the signalling device.

The invention both as to structure and operation, together with additional objects and advantages thereof, will be best understood from the following detailed description of a preferred embodiment thereof, when read in connection with the accompanying drawings.

In said drawings:

Fig. 7 is a schematic diagram showing the time current characteristics of the trip device shown in Fig. 2 and the time-current characteristics of the time-delay signalling device shown in Fig. 6.

The invention is illustrated as applied to a circuit breaker of the type fully disclosed in United States Patent No. 2,669,623, issued February 16, 1954, to J. B. MacNeill, Fritz E. Florschutz, Ture Lindstrom and B. G. Tremblay, and assigned to the assignee of the present invention.

Figure 1:
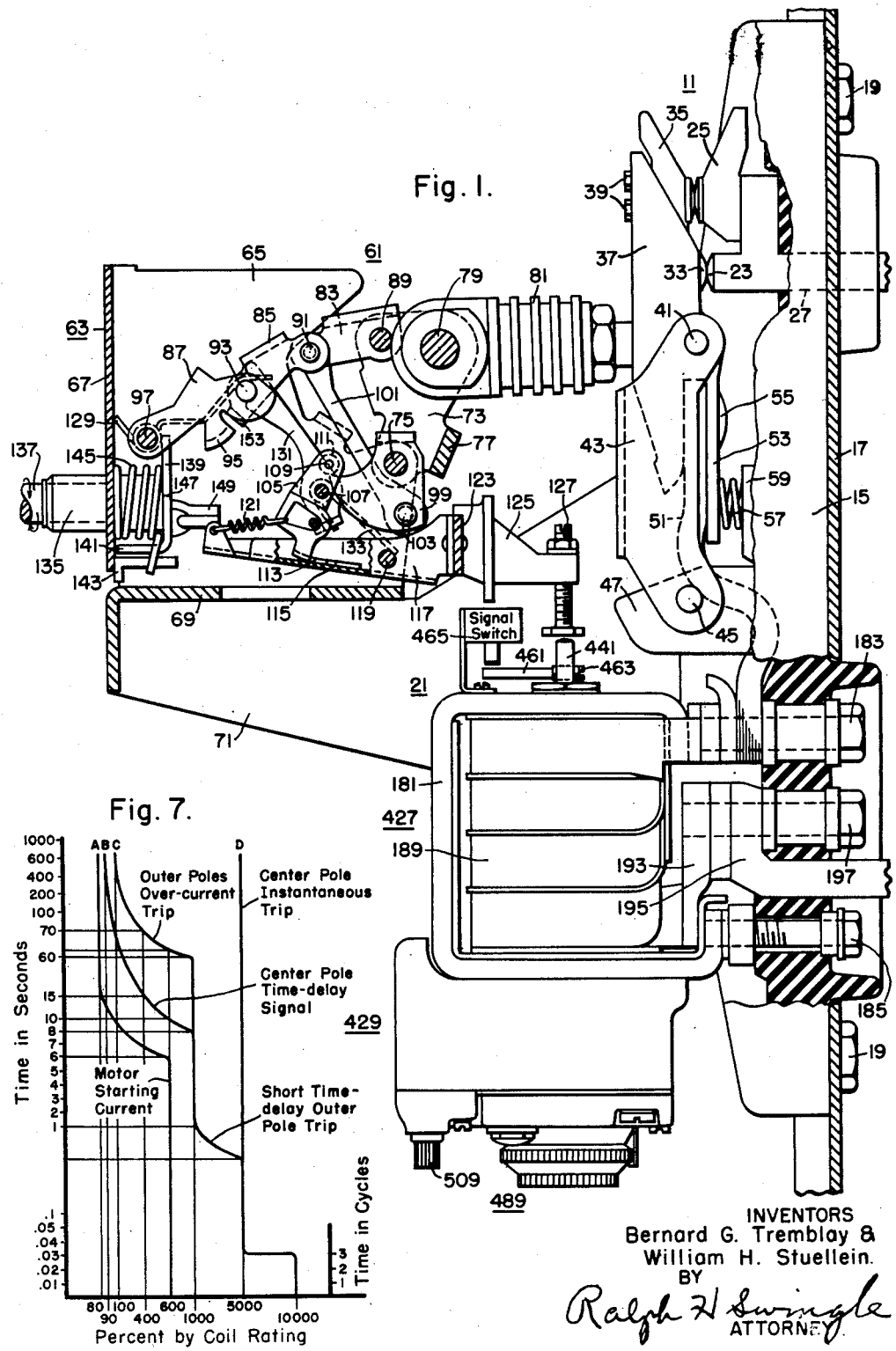
Fig. 1 is an elevational view partly in section of a circuit breaker embodying the principles of the invention.
Figure 6:
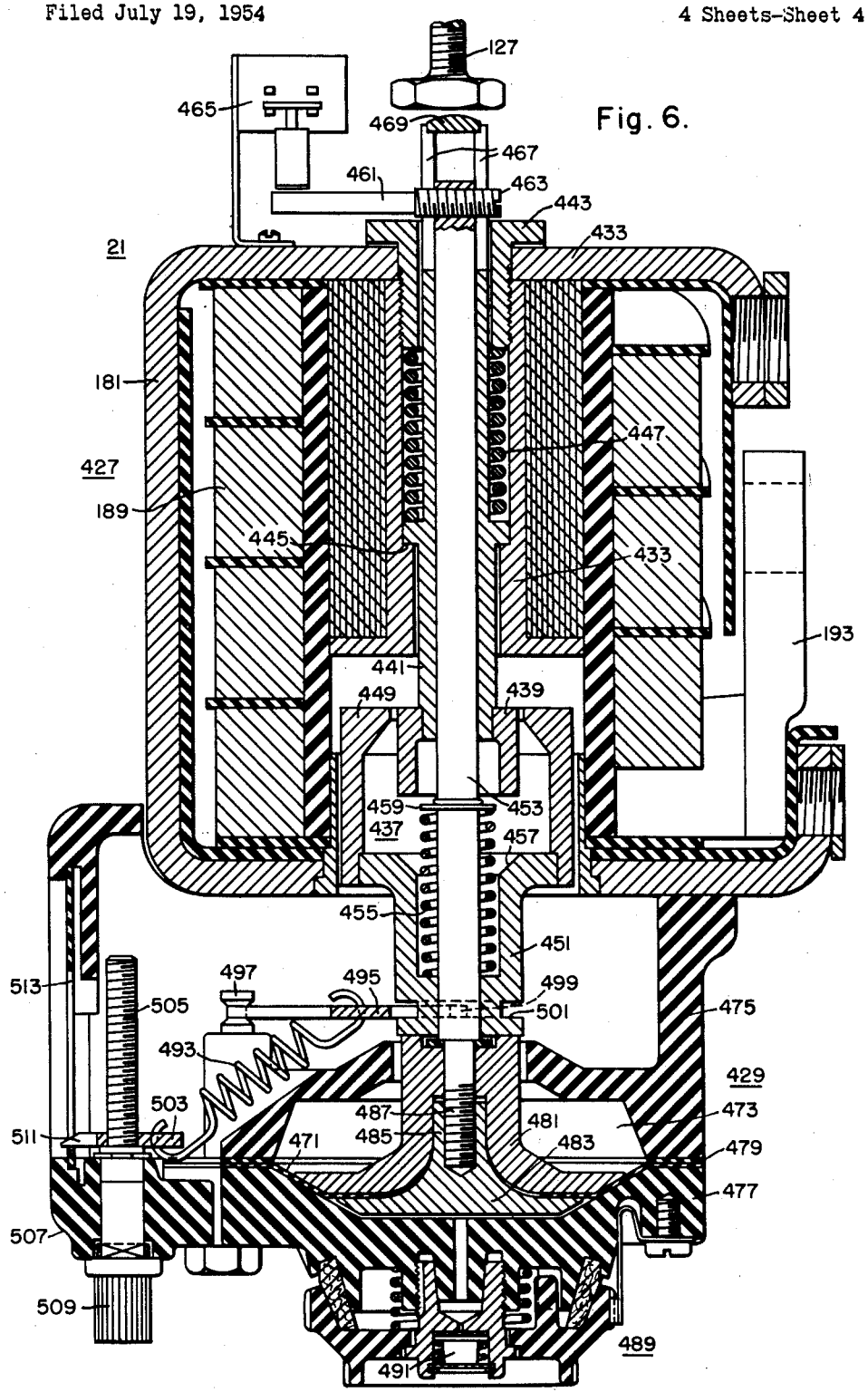
Fig. 6 is a vertical sectional view through the time-delay signalling and instantaneous trip device.

Referring to the drawings, the circuit breaker includes a plurality of pole units each comprising a contact structure indicated generally at 11, an overcurrent trip device indicated generally at 13 (Fig. 2), and an instantaneous trip and time-delay signal device 21 (Figs. 1 and 6). The contact structure and the trip device for each pole unit are mounted on a separate insulating base 15 which is rigidly secured to a metal panel 17. Since the pole units are alike, only the center pole unit is illustrated and described.

The insulating base 15 for the center pole unit is secured to the panel 17 by means of screws 19 threadedly engaging metal inserts (not shown) molded integral with the insulating base 15.

The contact structure 11 comprises a stationary main contact 23 and a stationary arcing contact 25, both of which are secured on the inner end of a terminal conducting bar 27 which extends through a suitable opening in the base 15.

Cooperating with the stationary main and arcing contacts 23 and 25, respectively, is a movable main contact 33 and a movable arcing contact 35. The movable contact 33 is secured in a suitable manner as by welding to a pivoted contact carrying member 37 and the movable arcing contact 35 is secured by means of screws 39 to the contact member 37.

The contact carrying member 37 is pivotally mounted by means of a pivot pin 41 on the upper or free end of a generally U-shaped switch arm 43 having its two legs pivoted by means of separate pivot pins 45 supported in spaced brackets 47 which are mounted on the base 15, there being a separate bracket 47 and pivot pin 45 for each leg of the switch arm 43, only one of each, however, being shown.

The movable contact carrying member 37 is electrically connected by means of a flexible shunt conductor 51 to the energizing coil of the trip device 13 which will be described later. The upper end of the flexible conductor 51 is rigidly clamped to the lower end of the contact member 37 by means of a plate 53 which has an integral portion 55 of the contact member projecting through an opening therein and having its end riveted over against the plate in the manner shown in Fig. 1. A spring 57 compressed between the plate 53 and a spring seat 59 in the insulating base 15 provides contact pressure in the closed position of the breaker and also biases the movable contact structure in opening direction.

The movable contact structure is normally maintained in the closed position by an operating mechanism indicated generally at 61 (Fig. 1) mounted in a U-shaped frame 63. The frame 63 comprises side members 65 (only one being shown) and a cross member 67 and is supported on a platform 69 forming the cross member of a generally U-shaped main bracket comprising a pair of spaced side members 71 (only one being shown) joined at their outer ends by the cross member or platform 69. The platform 69 extends across the width of the breaker and the side members 71 are suitably secured to the metal panel 17 on the outside of the two outer poles of the breaker.

The operating mechanism includes a lever 73 pivotally mounted on a pivot pin 75 supported in the side members 65 of the frame 63. The lever 73 comprises a pair of spaced levers joined by a cross member 77 and between them carry the supporting rod 79 which extends across all three poles of the breaker. The rod 79 is operatively connected by means of an insulating connecting member 81 to the pivot pin 41 in the free end of the switch member 43 on which the movable contact member 37 is mounted. It will be understood that there is provided a connecting member 81 for each pole of the breaker connecting the rod 79 to the movable contact structure for each pole unit so that upon operation of the rod 79 the movable contacts for all three poles move in unison.

An operating linkage comprising toggle links 83, 85 and 87 is provided to hold the lever 73 and consequently the movable contacts in the closed position and to operate the movable contacts to open and closed positions. The toggle link 83 is pivotally connected to the lever 73 by a pivot pin 89. Similarly the toggle link 85 is connected by means of a knee pivot pin 91 to the toggle link 83 and by a pivot pin 93 to the toggle link 87. The toggle link 87 has a cam shaped member 95 thereon and is pivotally mounted on a fixed pivot 97 supported in the frame 63.

The linkages 83, 85 and 87 comprise two toggles, one of which 83—85 may be designated as the tripping toggle and the other 85—87 as the closing toggle. The tripping toggle 83—85 is normally slightly underset above a line drawn through the pivot pins 89—93 and the closing toggle 85—87 is normally underset below a line drawn through the pivots 91—97.

The tripping toggle 83—85 is normally biased in a direction to cause its collapse by a component of the springs 57 which bias the movable contact structures for the three poles of the breaker in opening direction and bias the connecting member 81 toward the left (Fig. 1). The tripping toggle 83—85 is normally prevented from collapsing by means of a main latch member 99 pivoted on the pivot pin 75 and connected by means of a link 101 to the knee pin 91 of the tripping toggle, the link 101 being connected to the latch member 99 by a pivot pin 103.

The main latch 99 is held in latching position by an intermediate latch lever 105 pivoted on a pin 107 supported in the frame 63. The latch lever 105 comprises a pair of spaced levers (only one being shown) which between them support a pin 109 upon which is rotatably mounted a latch roller 111. The lower ends of the latch levers are joined by an arcuate cross member 113 which forms a latch element engaging a light load latch 115 to hold the latch roller 111 in engagement with the main latch 99. The latch 115 is rigidly mounted on a channel-shaped member 117 pivotally mounted on a pin 119 supported in the frame 63. The latch 115 and the member 117 are biased to their latching positions by a spring 121 tensioned between the parts as shown in Fig. 1. Rigidly mounted on the right hand end of the channel-shaped member 117 is a trip bar 123 which extends across all the poles of the breaker and has secured thereto an insulating bracket 125 for each of the three poles of the breaker. Each of the brackets 125 has a headed screw 127 adjustably mounted therein for cooperation with the trip device 13 in a manner to be presently described.

It will be seen that as long as the main latch 99 is held in latching position by the latching mechanism just described, the tripping toggle 83—85 will, through the link 101, be held in the position shown, in which the breaker contacts are held in the closed position. The closing toggle 85—87 is biased in a direction to cause its collapse by a spring 129 coiled about the pivot pin 97, the spring having one end bearing against the cross member 67 and the other end bearing against the knee pivot pin 93 of the closing toggle. The closing toggle 85—87 is normally prevented from collapsing by a shouldered support member 131 pivoted on the pin 107 and biased by means of a spring 133 into supporting engagement with the knee pin 93 of the closing toggle.

Rigidly secured to the cross member 67 of the frame 63 is a bearing 135 in which is rotatably mounted a handle shaft 137. The outer end of the handle shaft 137 carries an operating handle (not shown) and a plate member 139 is secured to the inner end of the shaft 137. The plate member 139 has an outwardly formed portion 141 which, in the normal position of the handle, registers with a lug 143 formed inwardly from the cross member 67. A spring 145 coiled about the bearing 135 has its ends bearing against the portion 141 and the lug 143 in a manner to bias the shaft 137 and the operating handle in both directions to a central position. The plate 139 is provided with shouldered portions, one of which is shown at 147, which engage the lug 143 to limit the rotary motion of the handle. Also secured to the plate 139 is a cam member 149 which has the dual function of engaging the free end of the channel-shaped member 117 to manually trip the breaker open upon movement of the handle in one direction and of engaging the cam 95 on the closing toggle 85—87 to manually close the breaker upon movement of the handle in this opposite direction.

Assuming the circuit breaker to be in the closed position as shown in Fig. 1, the breaker is tripped open manually by rotating the handle shaft 137 in the proper direction during which movement the cam member 149 engages and actuates the channel-shaped latch member 117 in unlatching direction. This effects release of the latch member 115 whereupon the force exerted by the springs 57 biasing the switch arm 43 in opening direction, transmitted through the connections 81 and the lever 73, causes the tripping toggle 83—85 to collapse upwardly and effects opening movement of the movable contact structures of all of the poles of the breaker. When the tripping toggle collapses the link 101 rotates the latch 99 clockwise, forcing the latch roller 111 to unlatching position where it is held by the arcuate surface on the latch 99.

The closing toggle 85—87 does not immediately collapse following the release of the latch 99 since it is held by the support 131. However, during the collapsing movement of the tripping toggle the toggle link 85 rotates counterclockwise about the pivot pin 93. During this rotation of the link 85, an ear 153 formed thereon adjacent the pin 93 engages the support member 131 and disengages the shoulder thereon from the pin 93 whereupon the toggle 85—87 collapses downwardly under the bias of the spring 129. Collapse of the closing toggle 85—87 causes resetting of the tripping toggle to thrust transmitting position and resetting of the main latch 99 to latching position. As soon as the latch 99 is reset the spring 121 reengages the latch roller 111 with the main latch 99 and also reengages the latch member 115 with the latch element 113 to hold the latch roller 111 in latching position. The mechanism is now in condition for a closing operation.

The contacts are closed by operation of the shaft 137 by the handle. In order to close the contacts manually, the shaft 137 is rotated in the direction of the arrow, that is, clockwise as viewed from the front of the breaker. This operation of shaft 137 engages the eccentric cam 149 with the cam 95 on the toggle link 87, and straightens the toggle 85—87. Since, at this time, the knee of the toggle 83—85 is restrained by the link 101 and the main latch 99, the thrust of straightening the toggle 85—87 is transmitted by the toggle link 83 to rotate the lever 73 in a clockwise direction. This movement of the lever 73 is transmitted by the tie rod 79 and the several connectors 81 to the switch arms 43 to simultaneously close the contacts for all of the poles of the breaker. As the knee pin 93 for the toggle 85—87 arrives at the position shown in Fig. 1, the support 131 is moved by its spring 133 into supporting engagement with the pin 93 to maintain the contacts closed. Upon release of the handle the spring 145 restores the shaft 137 and the cam 149 to their normal position.

The circuit breaker is automatically tripped open by operation of the trip device 13 (Fig. 2) for one or more poles of the breaker and by a trip and signalling device 21 (Figs. 1 and 6) on one pole of the breaker. The trip device 13 (Fig. 2) includes an electromagnet indicated generally at 177 and the trip and signalling device 21 (Figs. 1 and 6) includes an electromagnet indicated generally at 427 (Figs. 1 and 6). The electromagnets 177 and 427 each includes a C-shaped magnet yoke 181 rigidly secured to the base 15 of its corresponding pole by means of bolts 183 and 185 (Fig. 1).

In addition to the magnet yoke 181, the trip device 13 (Fig. 2) includes a fixed core member 187 (Fig. 2), an energizing winding 189 and a movable armature 191. The bolt 183 (Fig. 1) which secures the upper end of the magnet yoke 181 to the base also serves to secure the lower end of the flexible conductor 41 to the upper turn of the winding 189. The lower turn of the winding has a conducting lug 193 electrically and mechanically secured thereto and this lug is secured to a conducting terminal 195 and to the base 15 by means of a bolt 197. The energizing winding 189 (Fig. 2) is thus electrically connected in series relation in the circuit through the breaker which extends from the terminal 27, the main and arcing contacts 23—33 and 25—35, the contact member 37, flexible conductor 51, energizing coil 189 of the trip magnet to the terminal 195. Upon energization of the tripping magnet the movable armature 191 is attracted upwardly and actuates a trip rod 199 which engages the headed screw 127 to operate the trip bar 123 and trip the breaker.

The movable armature 191 comprises an upper cup-shaped member 201 and a lower tubular member 203 rigidly secured together by suitable means such as brazing. The member 201 has a central opening therein and is adapted to slide over a sleeve 205 surrounding the trip rod. The sleeve 205 is limited in its upward movement relative to the trip rod 199 by means of a spring clip 207 seated in a groove in the trip rod. A spring 209 coiled about the trip rod 199 is compressed between the lower end of the sleeve 205 and the bottom of a counterbore 211 in the lower element 203 of the movable armature.

Figure 2:
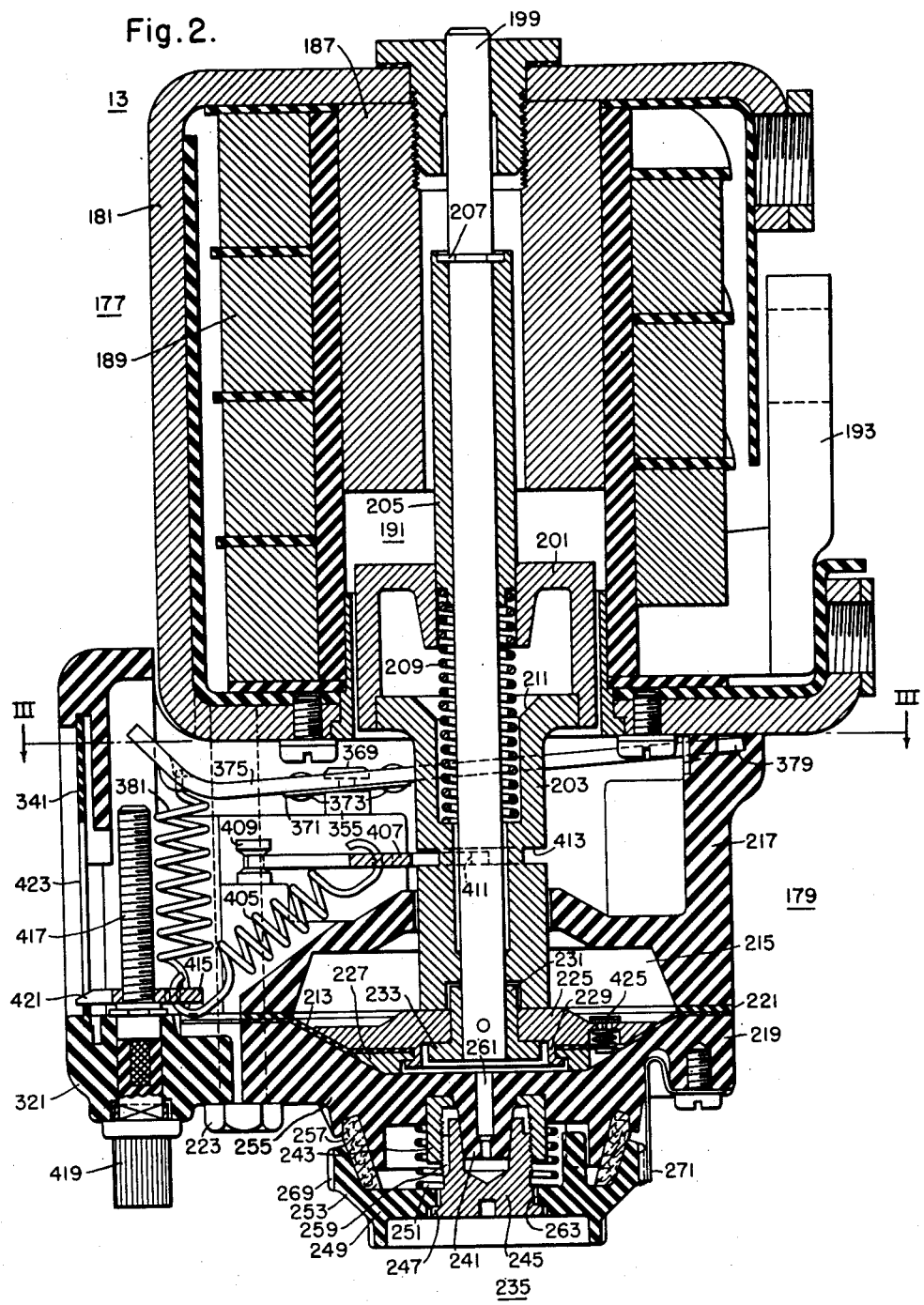
Fig. 2 is a vertical sectional view through the trip device taken substantially along line II—II of Fig. 3 and looking in the direction of the arrows.
Figure 3:
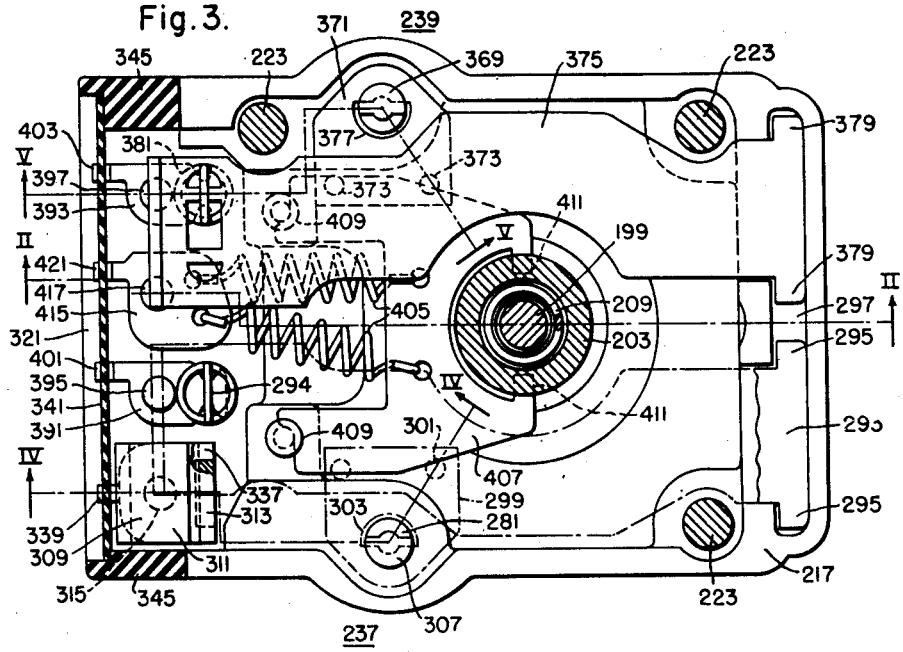
Fig. 3 is a sectional plan view of the time delay device taken substantially along the line III—III of Fig. 2 and looking in the direction of the arrows.

The trip rod 199 is moved upwardly to trip the breaker under the control of the time delay device 179 which comprises, generally, a flexible diaphragm 213 (Fig. 2) attached to the lower end of the trip rod and several valve elements for admitting air to the space below the diaphragm at various rates to provide for different amounts of time delay. The flexible diaphragm 213 is disposed in a chamber 215 formed in an upper housing member 217 and a lower housing member 219, both of said housing members being of molded insulating material. The outer edge of the diaphragm 213 is clamped between the housing members 217 and 219, together with a sealing gasket 221 to form an airtight seal. The housing members are secured together and rigidly secured to the magnet yoke 181 by means of bolts 223 (Figs. 2 and 3). The central portion of the diaphragm 213 is clamped between upper and lower clamp members 225 and 227, respectively, the upper clamp member 225 having an annular projection 229 extending downwardly though an opening in the lower clamp member 227 and formed over against the lower face of the latter to form an airtight seal.

Secured to the lower end of the trip rod 199 is a sleeve 231 having a flange 233 thereon brazed to the bottom face of the upper clamping member 225. The lower portion 203 of the movable armature extends downwardly through an opening in the upper wall of the chamber 215 above the diaphragm and is seated on the upper face of the clamping member 225. The spring 209 biases the trip rod 199 upwardly and biases the movable armature 191 downwardly. This results in biasing the lower end of the armature member 203 downward against the upper face of member 225.

Since the spaces above and below the diaphragm 213 are completely sealed off from each other and the space above the diaphragm is at atmospheric pressure, any force tending to raise the trip rod 199 will be restrained by the partial vacuum below the diaphragm. In order to control the rate of tripping movement of the trip rod 199 several valve devices are provided to admit air to the space below the diaphragm. The valve devices comprise a long-time delay valve indicated generally at 235 at the bottom of Fig. 2, a short time delay valve device indicated generally at 237 in Figs. 3 and 4 and an instantaneous valve device indicated generally at 239 in Figs. 3 and 5.

The long time delay valve device 235 will be described first. The central bottom portion of the housing member 219 is molded to form a valve seat 241 in the shape of an inverted truncated cone. Surrounding the valve seat 241 is a tubular metallic member 243 molded into the housing member 219 and threaded internally to receive a valve 245 having a conical opening therein for cooperating with the valve seat 241. The valve 245 is provided with a flange 247 for supporting a knurled adjusting knob 249 of molded insulating material which is biased thereagainst by a spring 251 coiled about the tubular member 243 and compressed between the bottom of the housing member 219 and upper surface of the adjusting knob 249. The outer portion of the knob is formed to provide a flange 253 extending outwardly and upwardly and cooperating with a flange 255 molded integral with the housing member to support and retain in place a suitable filter material indicated by the reference numeral 257 through which air is admitted to the chamber 215 below the diaphragm. It will be noted that an air passage 259 in the form of a groove is provided along the threaded surface of the valve 245 and a passage 261 is provided axially through the valve seat 241. The flow of air into the chamber below the diaphragm is through the filter 257, the passage 259, the orifice defined by the valve 245 and the valve seat and through the passage 261.

The inner surface 263 of the knob 249 is provided with serrations which cooperate with corresponding serrations on the valve 245, whereby rotation of the knob 249 also rotates the valve 245 which, due to its threaded engagement with the fixed tubular member, moves the valve axially of the valve seat 241 to thereby vary the rate of admission of air below the diaphragm and, hence, varies the amount of time delay.

The periphery of the knob 249 is provided with serrations as at 269 which are engaged by a spring pressed pawl 271 to retain the knob in its adjusted position.

The short-time delay valve device 237 (Fig. 4) controls a passage for admitting air from the chamber 215 above the diaphragm 213 to the space below the diaphragm at a rate to provide tripping with a very short time delay in the order of alternating current cycles. The valve device 237 comprises a tubular valve element 273 (Fig. 4) disposed in an opening 275 in the housing member 217 and having an enlarged head portion 277 seated in an opening 279 in the housing member 219 and held in place by a plug 347 which threadedly engages the opening 279. The valve element 273 is provided with a valve seat and a valve 281 slidable in the tubular valve element 273 normally cooperates with the valve seat to close a communication with opposite sides of the diaphragm. The valve element 273 is provided with an axial passage 283 in which is disposed a tapered projection 285 of the valve 281 and which is normally closed by the valve 281. The head 277 of the valve element 273 is provided with horizontal passages 287 disposed at right angles to each other. A passage 289 in the housing member 217 communicates the chamber 215 above the diaphragm 213 to the opening 275 above the valve seat and a passage 291 in the housing member 219 communicates the chamber 215 below the diaphragm 213 with the passages 287.

It will be seen that upward or opening movement of the valve 281 will open the passage 283 and establish a communication from the upper side to the lower side of the diaphragm through the passages 289, 283, 287 and 291.

The valve 281 is actuated to open position by means of an armature 293 which is biased to unattracted position by a spring 294 and is attracted upwardly by the tripping magnet 177 when this magnet is energized by overloads in an intermediate range of overloads of, for instance, 200% to 1000% of normal rated current. The armature 293 is shown in Fig. 3 broken away, but with the outline thereof shown by dot and dash lines. A portion of the armature 293 also appears in Fig. 4 of the drawings. An opening 296 (Fig. 4) in the magnet yoke 181 provides an air gap for the magnetic circuit through the armature 293. The armature 293 is provided with outwardly extending projections 295 (Fig. 3) which are seated in a recess 297 in the upper portion of the housing member 217 to pivotally support the armature. A bracket 299 (Fig. 4), secured by means of rivets 301 to the armature 293, has a semi-circular opening 303 (Fig. 3) therein which engages in a notch 305 in the upper end of the valve 281 so that upon actuation of the armature 293 the bracket 299 engages a substantially semi-circular head 307 on the valve 281 and moves the valve to open position. This opens the previously described communication permitting air to pass from the chamber 215 above the diaphragm to the space below the diaphragm to control the tripping movement of the trip rod 199 (Fig. 2). The rate of flow of air to the space below the diaphragm and consequently the rate of tripping movement of the trip rod are controlled by the amount of opening of the valve 281.

Figures 4, 5:
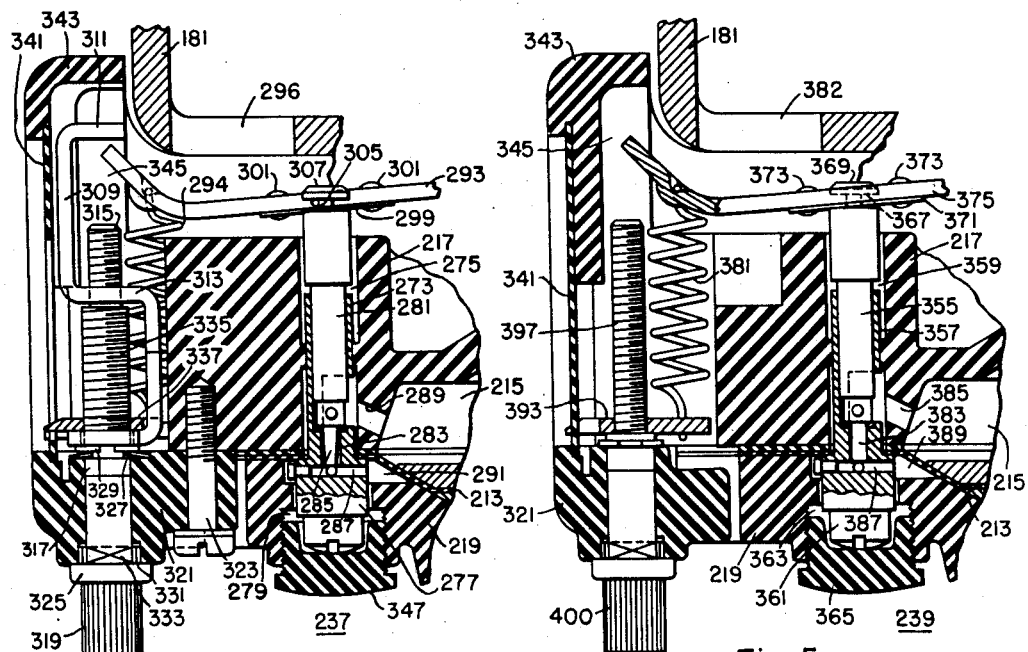
Fig. 4 is a fragmentary sectional view taken on line IV—IV of Fig. 3 and showing the short-time delay valve device and the adjusting means therefor.
Fig. 5 is a fragmentary sectional view taken substantially on line V—V of Fig. 3 and showing the instantaneous valve device and the adjusting means therefor.

The opening movement of the valve 281 is adjustably controlled by means of an adjustable S-shaped stop member 309 (Figs. 3 and 4). The upper portion 311 of the S-shaped member comprises an adjustable stop and is disposed in the path of tripping movement of the upturned end of the armature 293 to be engaged thereby and thus limit the upward movement of the armature 293 and limit the extent of opening of the valve 281. The center cross bar 313 of the S-shaped member 309 has a threaded opening therein which is engaged by a reduced threaded portion 315 of an adjusting screw 317, so that upon rotation of the screw 317 the S-shaped member 309 will be moved up or down, depending upon the direction of rotation, to provide for greater or lesser movement of the armature 293 and, hence, greater or lesser opening movement of the valve 281.

The lower end of the adjusting screw 317 has a reduced fluted portion molded into an insulating knob 319. The knob 319 is rotatably mounted in a cross bar 321 of molded insulating material. The cross bar 321 is supported on the underside of the upper housing member 217 by means of screws 323 only one of which is shown. The knob 319 is provided with a flanged portion 325 which is pressed against the bottom face of the cross bar 321 by means of a spring washer 327. The spring washer 327 is compressed between the upper surface of the cross bar 321 and a C-shaped washer 329. A spring 331 disposed in a recess in the cross bar 321 engages a square portion 333 of the knob 319 to retain the knob at each quarter rotation thereof.

The adjusting screw 317 has an enlarged threaded portion 335 which passes through a clearance opening in the bottom portion of the S-shaped member and threadedly engages an indicating member 337. The lower vertical portion of the S-shaped member 309 has cutaway portions on opposite edges thereof which are engaged by projections on the member 337 so that the latter will travel up and down without rotating. At the outer edge the member 337 is provided with a pointer 339 extending through a vertical slot in an index plate 341 supported at its lower end on the cross bar 321 and having its upper end secured to a cross member 343 molded integral with side members 345, which in turn, are molded integral with the housing member 217.

The thread on the portion 335 of the adjusting screw has approximately twice the lead as the thread on the portion 315, hence, for one rotation of the adjusting screw the member 337 and the pointer 339 will move twice the distance as the S-shaped member 309. This makes possible an expanded dial on the index plate 341 and provides for more accurate setting of the short time delay device.

The instantaneous valve device 239 shown in Fig. 5 is essentially the same as the short time delay valve device of Fig. 4, except that the tapered end 285 is omitted. The instantaneous valve device 239 comprises a valve 355 slidable axially in a valve member 357 removably supported in an opening 359 in the housing member 217. The valve member 357 is provided with a head 361 disposed in an opening 363 in the housing member 219 and rigidly held in place by a plug 365 which threadedly engages in the opening 363.

The upper end of the valve 355 is provided with a groove 367 forming a semi-circular head 369 (Figs. 3 and 5) adapted to cooperate with a bracket 371 secured by means of rivets 373 to an armature 375. The bracket 371 is provided with a semi-circular opening 377 for receiving the head 369 of the valve 355.

The armature 375 is similar to the armature 293 and is provided with pivot projections 379 for pivotally supporting the armature 375 in the recess 297 in the upper face of the housing member 217. The free end of the armature 375 is biased by means of a spring 381 to its unattracted position. The magnet yoke 181 is provided with an opening 382 (Fig. 5) which serves as an air gap for the magnetic circuit through the armature 375.

The valve member 357 is provided with an axially extending passage 383 which is normally closed by the valve 355. When the valve 355 is moved to its open position, it establishes a communication from the chamber 215 above the diaphragm 213 to the space below the diaphragm through a passage 385, the passage 383, a horizontal passage 387 in the head 361 and a passage 389.

The pickup point, that is, the magnitude of overload current required to actuate the armatures 293 and 375 may be varied by varying the tension of their respective springs 294 and 381. The upper end of the springs 294 and 381 are attached to their respective armatures and their lower ends are attached to movable members 391 and 393, respectively. The members 391 and 393 threadedly engage adjusting screws 395 and 397 respectively. The lower end of the screw 397 is molded into an insulating knob 400 (Fig. 5) rotatably mounted in the cross member 321. The lower end of the screw 395 is also provided with a knob (not shown) for adjusting the screw.

Upon rotation of the screws 395—397, their associated members 391—393 are moved up or down, depending on the direction of rotation to vary the tension of their respective springs, thus varying the pickup points of the armatures 293 and 375. The movable members 391 and 393 are provided with pointers 401 and 403, respectively, which extend through vertical slots in the scale plate 341 to prevent rotation of the movable member and to indicate the settings of the devices.

The pickup point for the movable armature 191 (Fig. 2) of the tripping electromagnet 177 may be similarly adjusted. The armature 191 is biased against attraction by means of springs 405 (Figs. 2 and 3) which have their upper ends attached to a U-shaped yoke 407 which has its two legs pivotally supported in spaced, grooved studs 409 supported in the housing member 217 substantially as shown in Figs. 2 and 3. The right-hand end of the yoke 407 is provided with inwardly extending projections 411 which engage in an annular groove 413 (Fig. 2) in the lower member 203 of the armature 191. The lower ends of the springs 405 are attached to a movable member 415 which threadedly engages an adjusting screw 417. The lower end of the adjusting screw 417 is molded into an insulating knob 419 rotatably mounted in the cross member 321. The movable member 415 is provided with a pointer 421 extending through a slot 423 (Fig. 2) in the scale plate 341 to prevent the movable member from turning and to indicate the setting. It will be understood that the scale plate 341 bears indicia adjacent the several pointers indicating the settings of the several adjusting devices.

The trip device operates with time delays of different durations in two distinct ranges of overcurrents below a predetermined magnitude, and instantaneously in response to overcurrents above the predetermined magnitude, or in response to short-circuit currents. The ranges of overcurrents may be arbitrarily defined as, for example, a low range up to 500% or 600% of normal rated current, an intermediate range between 500% or 600% and 1000% of normal rated current, and instantaneous 1000% or more of normal rated current.

Assuming an overcurrent within the low range of overcurrents the trip device will operate as follows: Upon the occurrence of an overcurrent in the low range, the tripping electromagnet becomes energized and attracts the armature 191 upwardly. The armature acts through the spring 209 and the sleeve 205 to produce an upward thrust on the trip rod 199, the movement of the trip rod being retarded by the partial vacuum below the diaphragm 213. The trip rod 199 moves slowly in tripping direction as air is drawn into the space below the diaphragm through the long time delay valve 235 until the upper end of the trip rod engages the headed screw 127 (Fig. 1) and actuates the latch mechanism to effect tripping the breaker in the manner previously described. The time delay provided by the long time delay device 235 is in the order of seconds and may be varied by adjusting the valve 241—245, as set forth previously.

As soon as the breaker contacts are opened, the tripping magnet 177 is deenergized, and the armature 191 and the trip rod 199 are restored by means of the springs 405 and the force of gravity to their Fig. 2 positions. A spring biased bypass valve 425 (Fig. 2) controls a passage through the diaphragm 213 to provide for quick restoration of the armature 191, the trip rod 199 and diaphragm 213 to their normal positions following a tripping operation.

When an overcurrent occurs in the intermediate range of overcurrents, the electromagnet 177 is energized sufficiently to attract the short time delay armature 293 (Fig. 4) upwardly against the adjustable stop 311 opening the short time delay valve 281 an amount determined by the adjustment of the stop 311. This admits air to the space below the diaphragm 213 at a higher rate than the long time delay valve alone and provides a relatively short time delay in the order of cycles in the tripping operation.

Energization of the tripping magnet 177 in response to an overcurrent in the intermediate range is not sufficient to attract the armature 375 for the instantaneous valve 239 (Fig. 5). However, upon the occurrence of an overcurrent of 1000% or more of rated current, both the short time delay armature 293 and the instantaneous armature 375 are actuated and open both the short time delay valve 281 (Fig. 4) and the instantaneous valve 355 (Fig. 5), thereby admitting air to the space below the diaphragm 213 at a rate sufficient to permit substantially instantaneous tripping movement of the trip rod 199.

The instantaneous trip and time delay signalling device 21, shown in Figs. 1 and 6, is similar to the device shown in Fig. 2, the chief difference being the omission of the short-time delay valve device 237 and the instantaneous valve device 239, and the inclusion of a separate armature for effecting instantaneous tripping and the utilization of the long-time delay feature for operating a signalling device.

The device includes an electromagnet indicated generally at 427 (Fig. 6) and a time delay device indicated generally at 429. The electromagnet 427 comprises a C-shaped magnet yoke 181 like the magnet yoke shown in Fig. 2 rigidly secured to the base 15 of its corresponding pole in the manner shown in Fig. 1, a fixed core member 433, an energizing winding 189 which is the same as the winding shown in Fig. 2, an armature 437 for operating the time delay signalling device and a separate instantaneous tripping armature 439. The energizing winding 189 is connected in the circuit for its pole unit in the manner shown in Fig. 1. The instantaneous tripping armature 439 is rigidly secured on the lower end of a tubular trip member 441 which extends upwardly through the fixed core member 433 and is guided at its upper end by a flanged nipple 443 which threadedly engages the bore of the fixed core member to secure the latter to the upper leg of the C-shaped fixed magnet yoke. The tubular member 441 is biased to its unattracted position against a shoulder 445 on the fixed core member by a spring 447 coiled about the member 441 and compressed between the inner end of the nipple 443 and an integral collar on the member 441.

The armature 437 comprises an upper member 449 and a lower tubular member 451 rigidly secured together. An actuating rod 453 extends axially through the armature 437, the armature 439 and the tubular member 441. A spring 455 coiled about the rod 453 is compressed between the bottom of a counterbore 457 in the tubular member 451 and a collar 459 on the rod 453.

A rod 461 having an enlarged threaded portion 463 which is threaded into a transverse opening in the upper end of the rod 453 is adapted to actuate a signal switch device 465 mounted on the upper leg of the magnet yoke 181. The rod 461 extends through opposite slots 467 in the upper end of the tubular trip member 441, in order to permit independent movement of the tubular member 441 and the rod 453. A rounded button 469 is rigidly secured to the upper end of the tubular member 441 for engaging the head of the screw 127 and actuating the latch mechanism upon tripping movement of the tubular trip member 441.

The rod 453 is moved upwardly to actuate the signal switch 465 under the control of the time delay device 429 which comprises a flexible diaphragm 471 attached to the lower end of the rod 453. The flexible diaphragm 471 is disposed in a chamber 473 formed in an upper housing member 475 and a lower housing member 477, both of the housing members being of insulating material. The outer edge of the diaphragm is clamped between the housing members 475 and 477, together with a sealing gasket 479 to form an air-tight seal. The central portion of the diaphragm 471 is tightly clamped between upper and lower clamp members 481 and 483 respectively. The lower clamping member 483 has a stem 485 which extends upwardly into an opening in the bottom of the upper clamping member and is threaded onto a reduced lower end 487 of the rod 453, thus rigidly clamping the members 481 and 483 together with the inner edge of the diaphragm therebetween to form an air-tight seal.

Air is admitted to the space below the diaphragm under the control of an adjustable valve device 489 which is the same as the long-time delay valve device 235 for the trip device shown in Fig. 2. The valve device 489 (Fig. 6), however, has a reset valve 491 in the bottom thereof for venting the air from the space below the diaphragm 471 following an operation of the rod 453 to permit resetting of the time delay signal actuating device. Otherwise, the structure and operation of the valve 489 is the same as the hereinbefore described valve 235 (Fig. 2).

The armature 437 is biased against attraction by means of springs 493 (only one being shown) which have their upper ends attached to a U-shaped yoke 495 having its two legs pivotally supported in spaced, grooved studs 497 supported in the housing member 477. The right-hand end of the yoke 495 is provided with inwardly extending projections 499, only one being shown, which engage in an annular groove 501 (Fig. 6) in the lower member 451 of the armature 437. The lower ends of the springs 493 are attached to a movable member 503 which threadedly engages an adjusting screw 505 rotatably supported in a cross member 507 rigidly secured to the upper housing member 475. A knurled knob 509 on the end of the screw 505 is provided for turning the screw to adjust the tension of the springs 493 to vary the pick-up point, that is, the minimum current required to actuate the signalling device. The movable member 503 is provided with a pointer 511 which extends through a vertical slot in a scale plate 513 to prevent the movable member 503 from turning and to indicate the setting of the device.

Upon the occurrence of, for instance, up to 500% or 600% of normal rated current, the electromagnet 427 (Figs. 1 and 6) becomes sufficiently energized to attract the armature 437 upwardly. The armature acts through the spring 455 to produce an upward thrust on the rod 453, but the movement of the rod is retarded by the partial vacuum below the diaphragm 471. The rod 453 moves slowly upwardly as air is drawn into the space below the diaphragm through the valve device 489. During the upward movement of the rod 453, the rod 461 in the upper end thereof engages and actuates the signal switch 465 without tripping the breaker.

The rod 453 will be held in its moved position to maintain the signal switch operated until the overload condition is corrected and the load returns to normal as the circuit breaker is opened by the trip device shown in Fig. 2 on another pole of the breaker. As soon as the breaker contacts are open or the current in the coil 189 returns to normal, the armature 437 and the rod 453 are restored to their normal positions by the springs 493 aided by their own weight, the air in the space below the diaphragm 471 being vented through the reset valve 491.

Energization of the electromagnet 427 (Fig. 6) in response to an overcurrent of 1000% or more of rated current or a short-circuit current causes the armature 439 to move the tube 441 upwardly and instantaneously trip the breaker. As soon as the breaker contacts are open and the electromagnet 427 is deenergized, the armature 439 is restored to its normal position by the spring 447 and its own weight.

When the electromagnet 427 (Fig. 6) is energized in response to overload currents above 1000% of normal rated current, the armature 449 is attracted immediately to the fixed core member 433 compressing the spring 455. This limits the force applied by the armature 449 to the time delay device and prevents damage thereto.

The pick-up point for the armature 191 of the trip device shown in Fig. 2 is adjusted by turning the knob 419, and the pick-up point for the armature 437 of the signalling device shown in Fig. 6 is adjusted by turning the knob 509.

The amount of time delay in the operation at the trip rod 199 (Fig. 2) to trip the breaker is varied by adjusting the knob 249 for the valve 235, and the amount of time delay in the operation of the signal device operating rod 453 (Fig. 6) is varied by adjusting the valve device 489.

While the time delay signal and instantaneous trip device (Fig. 6) has been described as disposed on the center pole unit of the breaker, it will be understood that this device will function equally as well on one of the outer poles.

Referring now to Fig. 7, the curve C illustrates the time-current characteristics of the overcurrent trip device shown in Fig. 2. It will be seen that the overcurrent trip (Fig. 2) will pick up at approximately 100% of rated current, while the time-delay signalling device (Fig. 6) will pick up at approximately 90% of coil rating. Thus, the signalling device (Fig. 6) will function in response to a given overload current to give a signal before the overcurrent trip device (Fig. 2) trips the breaker.

Assuming an overload current of, for example, 400% of coil rating, it will be seen from Figure 7 that the time delay signalling device (curve B) will actuate the signal switch 465 (Fig. 6) after a delay of approximately 15 seconds. However, as seen on curve C, the overcurrent trip device 13 (Fig. 2) will not trip the breaker until after a further time delay of 55 seconds, thus giving the switchboard attendant almost a minute to reduce the load or to take whatever action is necessary to correct the situation. This feature permits motor starting without giving a signal. Curve A (Fig. 7) illustrates a conventional time-current requirement for starting a motor. It will be noted that approximately 6 seconds are required to start the motor after which the current drops rapidly to normal before the time-delay signal device functions to give a signal. If for some reason or another the high starting current persists, the device shown in Fig. 6 will function with a time delay to give a signal, and, if the condition persists, the overcurrent trip device 13 will function after a further time-delay to trip the breaker.

If a heavy overload or a short-circuit current occurs in the pole in which the signal and trip device 21 (Fig. 6) is connected, the armature 439 will be attracted upwardly and instantaneously trip the breaker. The time-current characteristic of the instantaneous trip is shown on curve B (Fig. 7) and coincides with that of the other poles of the breaker.

While the time delay signalling device and the instantaneous trip means of Fig. 6 are operated by the same electromagnetic means, each is operable independently of the other.

The time-current characteristics illustrated in Fig. 7 are merely by way of example, and these may be varied by the several adjustments previously described.

The invention provides in a single trip device associated with one pole of the breaker, a device for giving a warning signal a predetermined time after the occurrence of an overload current below a predetermined value and an instantaneous trip device responsive to overload currents above said predetermined value, both of which devices are operated by a single electromagnet. The time-delay signal device delays giving the signal for a predetermined time after the beginning of the overload current in order to permit motor starting without giving a signal in response to motor starting currents. If the overcurrent persists, the breaker will be tripped after a further time delay by the overcurrent trip device of another pole of the breaker.

Having described the invention in accordance with the provisions of the patent statutes, it is to be understood that various changes and modifications may be made in the structural details and combination of elements disclosed without departing from the spirit of the invention.

We claim as our invention:

1. In a circuit breaker having separable contact means and operating means therefor, an auxiliary switch device, an electromagnet, a switch actuating member movable by said electromagnet when said electromagnet is energized in response to overload currents below a predetermined value to operate said auxiliary switch device only, time delay means for effecting a time delay in the movement of said movable switch actuating member, and means operable independently of said switch actuating member when said electromagnet is energized in response to overload currents above said predetermined value to effect automatic separation of said breaker contact means.

2. In a circuit breaker having separable contact means and operating means therefor, an auxiliary switch device, an electromagnet, a switch actuating member movable by said electromagnet when said electromagnet is energized in response to overload currents below a predetermined value to operate said auxiliary switch device only, time delay means for effecting a time delay in the movement of said switch actuating member, adjusting means for adjusting said time delay means to vary the amount of time delay provided in the movement of said movable member, and means operable independently of said switch actuating member when said electromagnet is energized in response to overload currents above said predetermined value to effect automatic separation of said breaker contact means.

3. In a circuit breaker having separable contact means and operating means therefor, an auxiliary switch device, an electromagnet having a switch actuating armature, a switch actuating member movable by said switch actuating armature when said electromagnet is energized in response to overload currents below a predetermined value for operating said auxiliary switch device only, time delay means for effecting a time delay in the movement of said movable member, and a tripping armature operable independently of any operation of said auxiliary switch upon energization of said electromagnet in response to overload currents above said predetermined value to effect automatic separation of said contact means.

4. In a circuit breaker comprising relatively movable contacts and operating means therefor, an electromagnetic trip device having a tripping armature operable upon energization of said electromagnet in response to overload currents above a predetermined value to effect instantaneous opening of said contacts, an auxiliary switch device, a switch operating armature operable independently of said tripping armature upon energization of said electromagnet in response to overload currents below said predetermined value to operate said auxiliary switch device only, and time delay means for effecting a time delay in the operation of said auxiliary switch device.

5. In a circuit breaker having relatively movable contacts and operating means therefor, an electromagnetic trip device comprising a tripping armature operable upon energization of said eelctromagnet in response to overload currents above a predetermined value to effect instantaneous opening of said contacts, an auxiliary switch device, a switch actuating member movable to operate said auxiliary switch device, a switch operating armature operable independently of said tripping armature upon energization of said electromagnet in response to overload currents below said predetermined value to move said switch actuating member only, and time delay means for effecting a time delay in the movement of said switch actuating member.

6. In a circuit breaker having relatively movable contacts and operating means therefor, an electromagnetic trip device comprising a tripping armature operable upon energization of said electromagnet in response to overload currents above a predetermined value to effect instantaneous opening of said contacts, an auxiliary switch device, a member movable to operate said auxiliary switch device only, a switch operating armature operable independently of said tripping armature upon energization of said electromagnet in response to overload currents below said predetermined value to move said member, and time delay means for effecting a time delay in the movement of said member, said auxiliary switch device being operable only when said electromagnet is energized in response to overload currents below said predetermined value.

7. In a circuit breaker having separable contact means and operating means therefor, a trip device comprising an electromagnet having a tripping armature operable upon energization of said electromagnet in response to overload currents above a predetermined value to effect separation of said contact means, an auxiliary switch device, means comprising a switch actuating armature operable upon energization of said electromagnet in response to overload currents below said predetermined value for operating said auxiliary switch device only, a time delay device calibrated to delay operation of said auxiliary switch device for a predetermined time after the occurrence of an overload current, a separate overcurrent trip device operable in response to overload currents below said predetermined value to effect separation of said contact means, and time delay means calibrated to delay operation of said separate overcurrent trip device for a predetermined time after operation of said auxiliary switch device.

8. In a circuit breaker having separable contact means, an auxiliary switch device, an electromagnet having a tripping armature operable upon energization of said electromagnet in response to overload currents to operate said auxiliary switch device only, a time delay device calibrated to delay operation of said auxiliary switch device for a predetermined time after the occurrence of an overload current, said auxiliary switch device being operable independently of said tripping armature only when said electromagnet is energized in response to overload currents below a predetermined value, a separate overcurrent trip device operable in response to overload currents below a predetermined value to effect separation of said contact means, and time delay means calibrated to delay operation of said separate overcurrent trip device for a predetermined time after operation of said auxiliary switch device.

9. In a multi-pole circuit breaker having separable contact means in each pole, operating means for said contact means, an electromagnet in one pole of said breaker, a tripping armature operable upon energization of said electromagnet in response to overload currents above a predetermined value to effect separation of said contact means, an auxiliary switch device, a switch operating armature operable independently of said tripping armature when said electromagnet is energized in response to overload currents below said predetermined value for operating said auxiliary switch device only, time delay means for delaying operation of said auxiliary switch device a predetermined time after the occurrence of an overload current, an overcurrent trip device in another pole of said breaker operable in response to overload currents below said predetermined value to effect separation of said contact means, and a time delay device for delaying operation of said overcurrent trip device in said other pole for a predetermined time after operation of said auxiliary switch device.

10. In a circuit breaker having separable contact means and operating means therefor, an auxiliary switch, an electromagnet energized in response to overload currents, a switch actuating rod movable upon energization of said electromagnet in response to overload currents below a predetermined value to operate only said auxiliary switch, time delay means for effecting a time delay in the operation of said switch actuating rod, and a tubular member operable independently of said switch actuating rod upon energization of said electromagnet in response to overload currents above said predetermined value to effect automatic separation of said contact means.

11. In a circuit breaker having separable contact means and operating means therefor, an auxiliary switch, an electromagnet energized by overload currents, a switch actuating rod movable to operate only said auxiliary switch, a switch actuating armature operable upon energization of said electromagnet in response to overload currents below a predetermined value to move said rod, time delay means for effecting a time delay in the movement of said switch actuating rod, a tubular member movable relatively to said switch actuating rod to effect separation of said contact means, and a tripping armature operable upon energization of said electromagnet in response to overload currents above said predetermined value to move said tubular member.

References Cited in the file of this patent

UNITED STATES PATENTS

| | | |
|---|---|---|
| 701,621 | Rucker | June 3, 1902 |
| 2,360,670 | Goetz | Oct. 17, 1944 |
| 2,632,823 | Oppel | Mar. 24, 1953 |

FOREIGN PATENTS

| | | |
|---|---|---|
| 450,528 | Germany | Oct. 15, 1927 |
| 682,564 | Great Britain | Nov. 12, 1952 |